United States Patent
Miettinen

(10) Patent No.: US 7,733,048 B2
(45) Date of Patent: Jun. 8, 2010

(54) METHOD AND ARRANGEMENT IN CONNECTION WITH MOTOR FED WITH FREQUENCY CONVERTER PROVIDED WITH INTERMEDIATE VOLTAGE CIRCUIT

(75) Inventor: Erkki Miettinen, Kokemäki (FI)

(73) Assignee: ABB Oy, Helsinki (FI)

( * ) Notice: Subject to any disclaimer, the term of this patent is extended or adjusted under 35 U.S.C. 154(b) by 344 days.

(21) Appl. No.: 11/957,804

(22) Filed: Dec. 17, 2007

(65) Prior Publication Data

US 2008/0150462 A1    Jun. 26, 2008

(30) Foreign Application Priority Data

Dec. 21, 2006    (FI) .................................. 20065835

(51) Int. Cl.
*H02P 5/00* (2006.01)
*G05D 23/30* (2006.01)

(52) U.S. Cl. ..................... 318/471; 318/362; 318/432; 318/442; 363/34; 363/55

(58) Field of Classification Search ................ 318/268, 318/362, 432, 442, 471; 363/34, 55; 62/186
See application file for complete search history.

(56) References Cited

U.S. PATENT DOCUMENTS

| | | | | |
|---|---|---|---|---|
| 5,633,790 A * | 5/1997 | Gritter et al. | ................... | 363/55 |
| 5,983,653 A * | 11/1999 | Lee | .............. | 62/186 |
| 6,404,150 B1 * | 6/2002 | Nehl et al. | ..................... | 318/34 |
| 6,600,249 B2 * | 7/2003 | Nelson et al. | ................. | 310/91 |
| 6,774,476 B2 * | 8/2004 | Spitz et al. | ................... | 257/686 |
| 6,798,162 B2 * | 9/2004 | Makaran et al. | ............. | 318/442 |
| 6,912,353 B2 * | 6/2005 | Nelson et al. | ................ | 388/825 |
| 6,979,964 B1 * | 12/2005 | Roe | .......................... | 318/139 |
| 7,023,712 B2 * | 4/2006 | Miettinen | .................... | 363/34 |
| 7,256,513 B2 * | 8/2007 | Kumar et al. | ................. | 307/9.1 |
| 7,436,138 B2 * | 10/2008 | Beifus | ........................ | 318/432 |
| 7,506,179 B2 * | 3/2009 | Templeton | ................... | 713/300 |
| 2002/0003381 A1 * | 1/2002 | Nelson et al. | ............. | 310/67 R |
| 2003/0173916 A1 * | 9/2003 | Nelson et al. | ................ | 318/268 |

(Continued)

FOREIGN PATENT DOCUMENTS

DE        199 42 258 A1    3/2001

(Continued)

OTHER PUBLICATIONS

Finnish Search Report (with English language translation of category of cited documents) dated Jul. 2, 2007.

(Continued)

*Primary Examiner*—Paul Ip
(74) *Attorney, Agent, or Firm*—Buchanan Ingersoll & Rooney PC

(57) ABSTRACT

Method and arrangement in connection with a motor fed with a frequency converter provided with an intermediate voltage circuit. The method comprises steps of feeding motor voltage to the motor along a motor cable with a frequency converter for controlling the motor, rectifying the voltage of the motor cable and restricting the magnitude of the voltage of the motor cable at the end of the motor cable on the side of the motor with a clipper circuit coupled in parallel with the motor, using the rectified voltage for rotating one or more cooling fans of the motor.

20 Claims, 1 Drawing Sheet

U.S. PATENT DOCUMENTS

Figure 1:
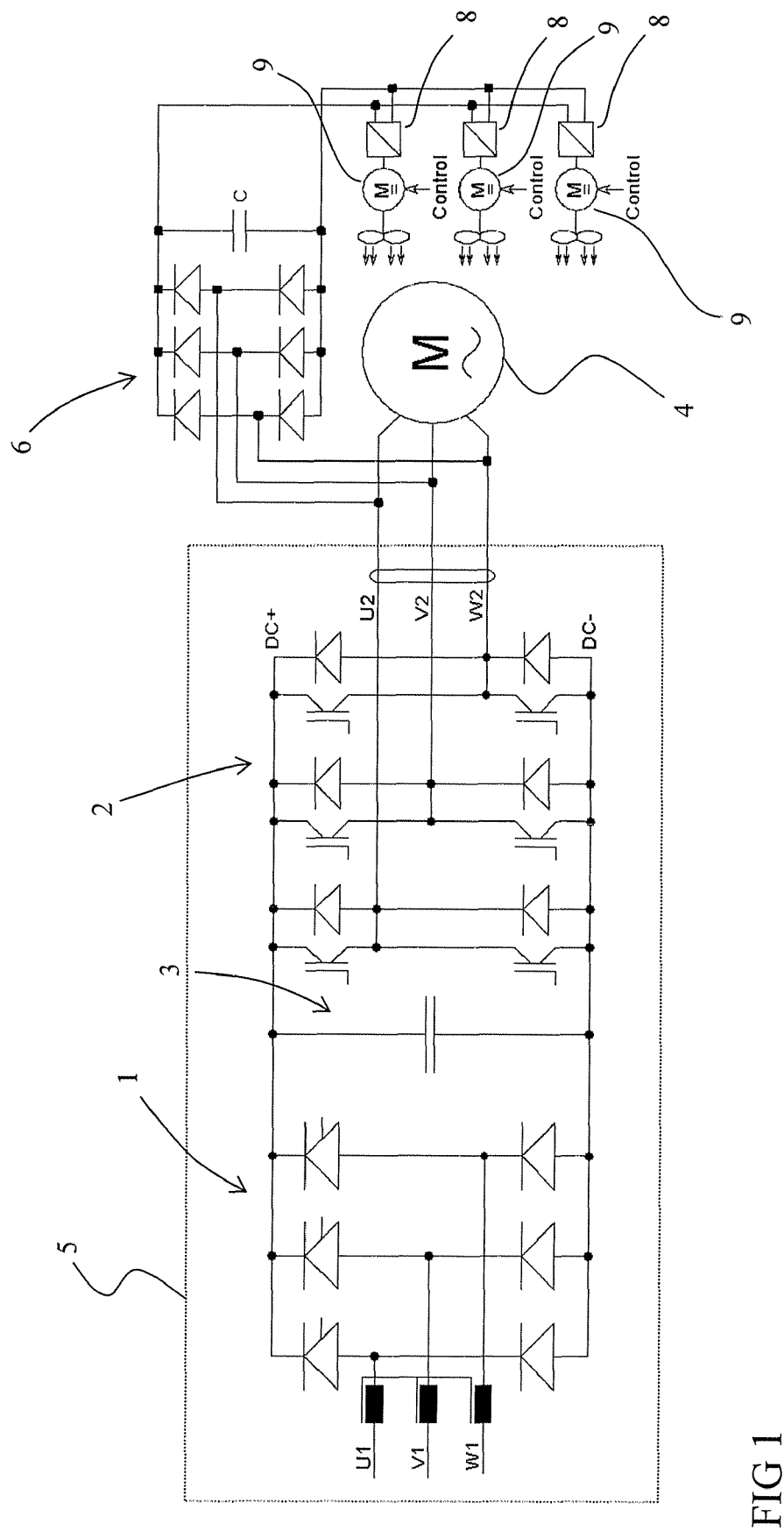

| | | | |
|---|---|---|---|
| 2004/0012356 A1* | 1/2004 | Makaran et al. | 318/442 |
| 2004/0119439 A1* | 6/2004 | Miettinen | 318/803 |
| 2004/0201279 A1* | 10/2004 | Templeton | 307/11 |
| 2005/0254800 A1* | 11/2005 | Nelson et al. | 388/825 |
| 2006/0119177 A1* | 6/2006 | Kumar et al. | 307/9.1 |
| 2007/0205731 A1* | 9/2007 | Beifus | 318/362 |
| 2007/0205732 A1* | 9/2007 | Beifus | 318/432 |

FOREIGN PATENT DOCUMENTS

| | | |
|---|---|---|
| WO | WO 01/39347 A1 | 5/2001 |

OTHER PUBLICATIONS

Finnish Office Action dated Jul. 2, 2007.

* cited by examiner

METHOD AND ARRANGEMENT IN CONNECTION WITH MOTOR FED WITH FREQUENCY CONVERTER PROVIDED WITH INTERMEDIATE VOLTAGE CIRCUIT

BACKGROUND OF THE INVENTION

The invention relates to clipping voltage pulses produced by a frequency converter and particularly to clipping reflection pulses caused by the output voltage pulses of the frequency converter in connection with a motor.

In frequency converters provided with IGBT switches in particular the rates of change of output voltages are so great that the surge voltage fronts they cause, together with output filters restricting the rates of change, cause reflections that are due to the effect of cable and motor wave impedances of different magnitudes. At their worst, these reflections may appear at the motor terminals as voltage peaks of even almost double the magnitude of the intermediate circuit voltage of the frequency converter, and as the peaks proceed in the motor windings, they may cause partial discharges between the winding turns and, gradually, to dielectric breakdown of turn insulations and destruction of windings.

It is known in the prior art to cut some of the energy of such voltage peaks by means of a three-phase diode bridge, for example, for intermediate storage into a high-speed capacitor and to discharge it from there into the environment in the form of heat by means of a resistor. At high motor powers in particular the amount power to be discharged may rise to kilowatts and therefore specific power resistors are needed to perform the task, but the placement and cooling of the resistors may be problematic. Moreover, particularly in industrial motors that run almost uninterruptedly the clipping of peaks may consume considerable amounts of energy, especially since the clipping power is hardly at all dependent on the degree of loading of the motor.

WO 01/39347 discloses a solution in which the effects of excess voltages of a motor are reduced by means of a separate auxiliary wire to transfer energy away from the motor. This energy that is transferred away is compensated by means of a suitable passive connection or fed back in a rectified form to the intermediate circuit of the frequency converter. A problem with this solution arises from significant costs caused by the use of the separate auxiliary wire.

As is known from the prior art, motors fed with frequency converters require, almost without exception, one or more cooling fans, because a fan mounted to the motor shaft is not sufficient to cool the motor at low revolutions. These cooling fans, which are typically provided with an induction motor, are usually fed from the same AC network as the frequency converter. However, if the supply voltage is high, for example 690 volts, relatively low power ($\leq 2.2$ kW) fan motors, have often been fed with a lower voltage, for example 400 volts, for reasons of winding durability. This in turn requires the use of heavy, bulky and expensive auxiliary voltage transformers

SUMMARY OF THE INVENTION

It is an object of the invention to provide a method and an arrangement implementing the method so as to overcome the above problems. The object of the invention is achieved by a method and arrangement characterized by what is stated in the independent claims. The preferred embodiments of the invention are disclosed in the dependent claims.

The invention is based on the idea of rectifying the voltage of the motor terminals fed by the frequency converter and supplying this rectified voltage to a capacitor. The capacitor voltage is further used for feeding a motor cooling fan, which has previously needed a power supply of its own.

An advantage of the method and arrangement of the invention is that voltage peaks at the motor terminals are reduced and, at the same time, the energy of the voltage peaks is used for feeding the fan motors. According to the invention the voltage acting in the motor terminals, together with its reflection peaks, is rectified by means of a three-phase diode bridge and the direct voltage thus obtained is used for rotating fans that cool the motor and, in exceptional cases, also the bearings. Almost without exception the energy obtained from clipping the reflection peaks alone is not sufficient for rotating the cooling fans at full power, which is why also some of the intermediate circuit level alternating voltage arriving to the motor is rectified to the cooling fans.

The rectified voltage may be used directly as a direct voltage for an auxiliary frequency converter used for rotating the fans. The rectified voltage may be further converted to suit other fan types.

Fan adjustability provides significant energy savings compared with a fan that constantly rotates at full power. The fact that almost all the energy contained in excess voltage peaks can be brought to use further improves the overall efficiency.

BRIEF DISCLOSURE OF THE FIGURES

In the following, the invention will be disclosed with reference to preferred embodiments and the accompanying drawings, in which FIG. 1 illustrates the structure of an arrangement of the invention.

DETAILED DISCLOSURE OF THE INVENTION

FIG. 1 is a schematic view of an arrangement of the main circuit of a frequency converter 5. The frequency converter is composed of a prior art network rectifier 1 that rectifies the network voltage to an intermediate circuit capacitor 3. An inverter 2 is provided for generating voltages pulses of a variable length from this rectified intermediate circuit voltage, the voltage pulses forming the output voltage of the frequency converter. FIG. 1 further shows a motor cable U2, V2, W2, which is coupled between the frequency converter output and a motor 4.

According to the invention the motor cable end at the motor side has a rectifier coupled thereto, for example a diode rectifier bridge 6, i.e. a peak clipper bridge, like the one shown in FIG. 1. The purpose of this rectifier is to convert the voltage supplied to the motor along the motor cable to direct voltage for the motor. There is also a the capacitor C coupled to the output of the rectifier 1, the capacitor further storing and smoothing the rectified voltage and, in particular, functioning together with the rectifier also as a means clipping the voltage peaks formed in the motor cable. The capacitor provides high-frequency voltages with a current path of low impedance, voltage peaks generated at the interface between the motor cable and the motor being thus transferred mainly to the capacitor. A three-phase rectifier bridge consisting of high-speed diodes rectifies all voltage visible at the coupling terminals of the motor to the capacitor C. Irrespective of the output voltage of the frequency converter the voltage of the capacitor always remains approximately equal to the intermediate circuit voltage of the frequency converter. The peak clipper bridge 6, C is coupled in parallel with the motor 4 fed by the frequency converter.

FIG. 1 further shows DC/DC converters 8 and DC motors 9 coupled to the capacitor C and receiving their supply from the DC/DC converters. The cooling fans of the motor may be diagonal fans whose supply voltage typically consists of a direct current of 48 volts and which have an internal semiconductor commutation. The high voltage level generated by the rectification is thus converted into a form suitable for one or more fans by means of fly-back converters, for example. At the same time, galvanic safety insulation is achieved, which means that the fans can be serviced under voltage. A model that may be quoted as an example of the above-mentioned diagonal fan is the manufacturer's Ebm-papst W1G180 the maximum power intake of which is 160 W.

According to an embodiment of the arrangement of the invention, the rectifier 6 and the capacitor C produce a voltage that is directly used as a voltage in the intermediate circuit of one or more auxiliary inverters. In that case one or more fan motors are thus controlled by means of one or more auxiliary inverters. This provides a means for obtaining a fan that is simple to adjust and whose motor may be an induction motor.

The inverter changing the state of a phase from DC-potential to DC+ potential, for example, sets off a surge wave along the motor cable U2, V2, W2. When the wave meets the motor connectors, it is reflected back towards the inverter and, at the same time, the voltage acting in the motor terminals attempts to rise, in a known manner, in a ratio determined by the wave impedances of the cable and the motor. Since the voltage of the capacitor C is on the average at the level of the intermediate circuit voltage, peak voltage is not able to rise freely but is rectified to the capacitor C. The energy of a peak of a short duration charges the capacitor C, whose capacitance determines how high the terminal voltage rises as a result of the peak.

Assuming that a typical charge of one reflection peak in a motor of 160 kW is 250 µAs and the capacitance of the capacitor C is 10 microfarads, the charge of one peak causes the terminal voltage of the capacitor to rise by 25 volts. With an average switching frequency of 3000 $s^{-1}$ of the frequency converter, the rectified average peaking current is 0.75 amperes. To neutralize this peaking current with an intermediate circuit voltage of 540 volts, for example, a continuous power of slightly more than 400 watts is required through DC/DC transformers or auxiliary inverters to the cooling fan motors.

On the other hand, since it is known that at full shaft power the cooling of a motor of this size typically requires an axial fan of 2.2 kW, there is no risk of the peaking power exceeding the power of the cooling fans, even with less than maximum fan speed. Power saving, then again, may be as much as 1.8 kW, if the motor is running almost idle. This means an improvement of several percents in the total efficiency at partial loads.

According to a preferred embodiment of the invention rectified DC voltage of the peak clipper arrangement 6, C may be combined with the intermediate circuit of the main frequency converter 5 by means of a very light two-terminal cable (e.g. 2*1.5 $mm^2$). This auxiliary voltage supply allows the fan to be made to rotate also when there is no voltage in the motor. Moreover, the invention allows the voltage of 48 volts obtained from the DC/DC transformer of the fan to be used also in other points of consumption of the motor. The DC voltage may also be provided with an inlet in connection with the motor for feeding optional loads.

The arrangement of the invention preferably includes a high-speed bidirectional data transfer bus (e.g. an optical fibre link) between the frequency converter and the motor. The link may be used for transmitting measurement data from the motor end, such as temperatures of motor windings and bearings, information about the angular velocity and/or position of the rotor, different data on the state of the bearings and rotational speeds of the fan motors. Information travelling to the opposite direction includes instructions on fan speeds determined on the basis of the temperature of the object to be cooled with the fan and the measured average terminal voltage of the capacitor C. The latter dependency is required for preventing uncontrolled increase in the terminal voltage of the capacitor C, if the fan load is too low. If desired, the speed control of the cooling fan may also be implemented independently, in response to the temperature of the motor to be cooled and the voltage of the capacitor C. In FIG. 1 the fan motor controls are indicated with the word 'Control'. These controls can thus typically be brought from the frequency converter 1 on the data transfer bus. The control part of the frequency converter, which usually controls the functions of the frequency converter, can be configured in a simple manner to transmit the necessary control signals. The control signals of FIG. 1 may be generated in the same way also when using an auxiliary frequency converter and the fan motor controlled by it. In that case the auxiliary frequency converter receives the speed instructions of the fan.

The peak clipper bridge 6 and the capacitor C of FIG. 1 are most preferably placed directly into the motor terminal enclosure, in which case only one cable of a small cross-section (2*1.5 $mm^2$) is needed for transferring the required power to the fans.

The arrangement of the invention preferably employs axial turbine-driven fans if their IP class is sufficient for the environment in question. A necessary number of fans is placed either in a conventional manner in a central location at the N-end of the motor or radially on the outer periphery of the motor, the cover plate covering the cooling ribs of the stator of the motor thus guiding efficiently the air flow towards both ends. The large closed central area left on the trailing side of the turbo-driven blower may be covered with a round circuit plate that has a galvanically isolating DC/DC transformer, dimensioned according to the fan power, implemented thereon. The transformer is most preferably of the fly-back type.

If a solution tighter than the IP class of turbo-driven fans is required, then it is advantageous that the fan motor is a fully closed induction engine with a frequency converter of its own placed into a separated casing, or the frequency converter is provided in the form of a component of a sufficient IP class as such.

A person skilled in the art will find it obvious that as technology advances the basic idea of the invention may be implemented in various ways. The invention and its embodiments are therefore not restricted to the above examples, but they may vary within the scope of the claims.

The invention claimed is:

1. A method in connection with a motor fed with a frequency converter provided with an intermediate voltage circuit, wherein the method comprises the steps of
    feeding motor voltage to the motor with the frequency converter along a motor cable for controlling the motor;
    rectifying the voltage of the motor cable and restricting the magnitude of the motor cable voltage at the motor cable end on the motor side with a clipper circuit coupled in parallel with the motor;
    using the rectified voltage for rotating one or more cooling fans of the motor.

2. A method according claim 1, wherein the clipper circuit comprises a rectifier bridge and a capacitor coupled to the output of the rectifier bridge for rectifying the motor cable voltage and for restricting overvoltage peaks.

3. A method according to claim 2, wherein the rectified voltage is used as a direct voltage for an auxiliary frequency converter used for controlling the motor of the cooling fan.

4. A method according to claim 2, wherein the rectified voltage is further converted into another voltage level for the DC fan to be controlled.

5. A method according to claim 1, wherein the rectified voltage is used as a direct voltage for an auxiliary frequency converter used for controlling the motor of the cooling fan.

6. A method according to claim 1, wherein the rectified voltage is further converted into another voltage level for the DC fan to be controlled.

7. An arrangement in connection with a motor fed with a frequency converter provided with an intermediate voltage circuit, wherein the arrangement comprises a clipper circuit coupled to the motor cable end on the motor side in parallel with the motor for producing a rectified voltage and for clipping excess voltages of the motor cable;
one or more cooling fans for the motor; and
means for feeding the rectified voltage to the cooling fan motor.

8. An arrangement according to claim 7, wherein the clipper circuit comprises a rectifier and a capacitor connected to the output thereof.

9. An arrangement according to claim 8, wherein the means for feeding the rectified voltage to the cooling fan motor comprise an inverter coupled to the rectified voltage, the inverter being configured to feed the cooling fan motor.

10. An arrangement according to claim 8, wherein the means for feeding the rectified voltage to the cooling fan motor comprise a DC/DC converter that is configured to produce a voltage level for the cooling fan motor from the rectified voltage.

11. An arrangement according to claim 8, wherein the arrangement further comprises an auxiliary voltage supply, which combines the direct intermediate voltage circuit of the frequency converter and the direct voltage of the peak clipper bridge, thus allowing the cooling fan motor to be rotated when there is no voltage in the motor cable.

12. An arrangement according to claim 7, wherein the means for feeding the rectified voltage to the cooling fan motor comprise an inverter coupled to the rectified voltage, the inverter being configured to feed the cooling fan motor.

13. An arrangement according to claim 7, wherein the means for feeding the rectified voltage to the cooling fan motor comprise a DC/DC converter that is configured to produce a voltage level for the cooling fan motor from the rectified voltage.

14. An arrangement according to claim 7, wherein the arrangement further comprises an auxiliary voltage supply, which combines the direct intermediate voltage circuit of the frequency converter and the direct voltage of the peak clipper bridge, thus allowing the cooling fan motor to be rotated when there is no voltage in the motor cable.

15. An arrangement according to claim 7, wherein the arrangement further comprises a bidiretional data transfer bus between the motor and the frequency converter, the bus being arranged to transfer measurement and control data.

16. An arrangement according to claim 7, wherein in connection with the motor to be cooled there is provided a member determining the temperature of the motor, the speed of the cooling fan being controlled in response to the temperature thus determined.

17. An arrangement according to claim 7, wherein the arrangement comprises means of determining the voltage of the capacitor of the clipper circuit, the speed of the cooling fans being controlled in response to a predetermined voltage.

18. An arrangement according to claim 7, wherein the frequency converter controlling the motor to be cooled produces a speed instruction for the cooling fan in response to the voltage of the capacitor and/or to the temperature of the motor to be cooled.

19. An arrangement according to claim 7, wherein the peak clipper bridge is placed into the switching cover of the motor to be controlled.

20. An arrangement according to claim 7, wherein the arrangement comprises a plural number of cooling fans and DC/DC converters or inverters feeding these.

* * * * *